J. A. McGRATH.
VEHICLE BRAKE.
APPLICATION FILED JULY 20, 1910.
1,009,081.
Patented Nov. 21, 1911.
2 SHEETS—SHEET 1.
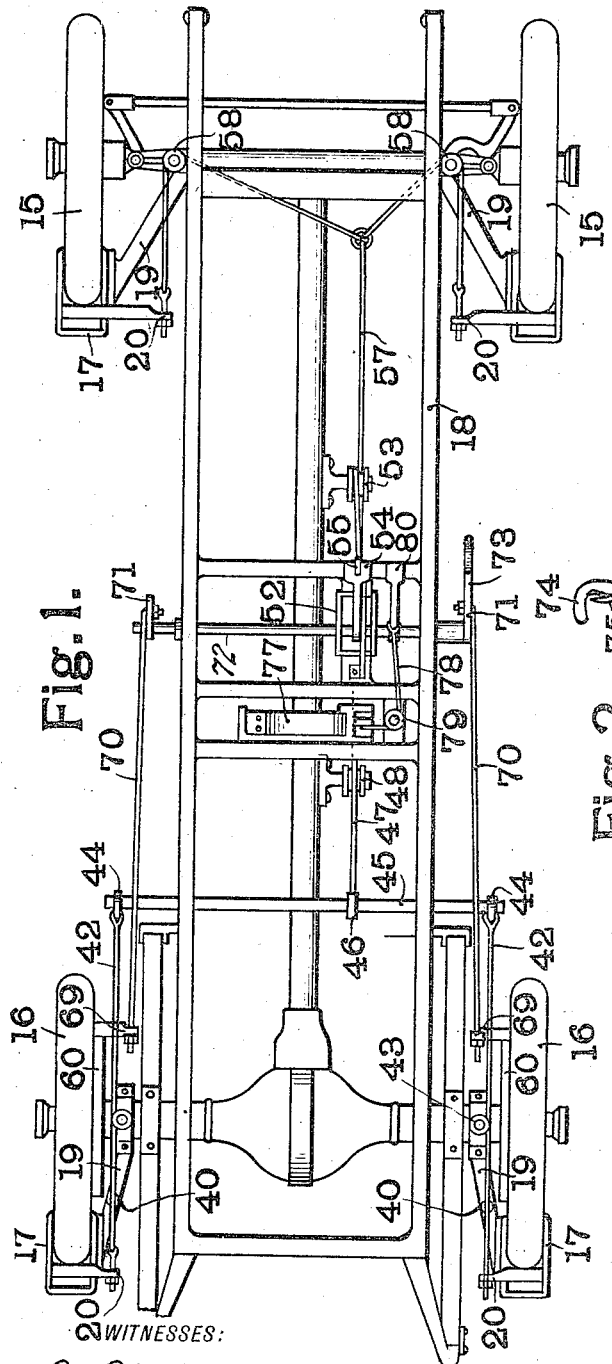
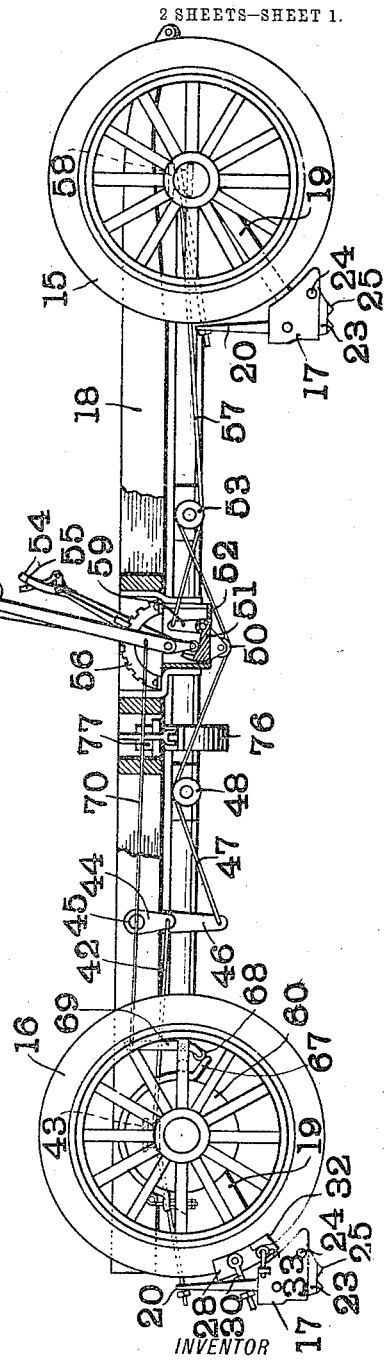
WITNESSES:
L. L. Mead.
W. H. Alexander.
INVENTOR
J. A. McGrath
BY Fowler & Huffman
ATTORNEYS

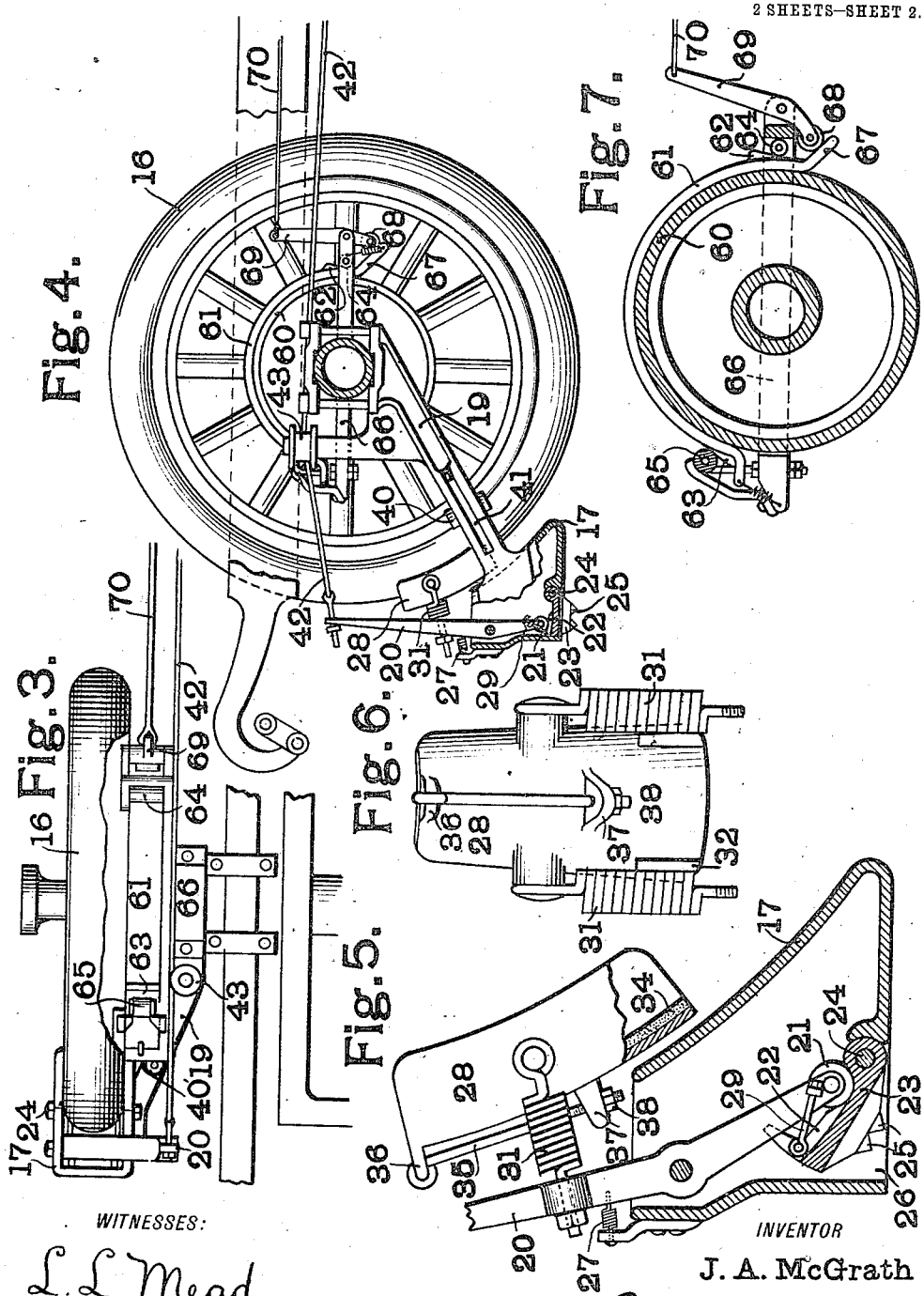

UNITED STATES PATENT OFFICE.

JOHN A. McGRATH, OF ST. LOUIS, MISSOURI.

VEHICLE-BRAKE.

1,009,081.　　　　　Specification of Letters Patent.　　Patented Nov. 21, 1911.

Application filed July 20, 1910. Serial No. 572,798.

*To all whom it may concern.*

Be it known that I, JOHN A. McGRATH, a citizen of the United States, residing at the city of St. Louis, Missouri, have invented a certain new and useful Vehicle-Brake, of which the following is such a full, clear, and exact description as will enable any one skilled in the art to which it appertains to make and use the same, reference being had to the accompanying drawings, forming part of this specification.

My invention relates to a vehicle brake and is intended for use either with motor road vehicles or with street or railway cars.

One object of my invention is to produce a brake in which the effective braking force will be exerted between the brake shoe and the ground or rail on which the vehicle runs, thus saving wear upon the wheels or tires of the vehicle.

Another object of my invention is to provide means whereby the momentum of the wheel itself will supplement the operator of the brake in exerting the force to operate the shoe.

Still another object of my invention is to so construct the brake that a portion or all of the weight of the vehicle may be transferred from the wheels to the shoes so that the vehicle may, if so desired, be raised entirely from the ground.

In the accompanying drawings which illustrate some forms of brake made in accordance with my invention Figure 1 is a top plan view showing my brake as applied to a motor vehicle; Fig. 2 is a side view partly in section; Fig. 3 is a top plan view of one of the rear wheels; Fig. 4 is a side elevation of one of the rear wheels some of the parts being shown in section; Fig. 5 is an enlarged detail view of the casing carrying the brake shoe; Fig. 6 is a rear view of the clamping shoe; and Fig. 7 is an enlarged sectional view of the band brake.

Like marks of reference refer to similar parts in the several views in the drawings.

15 represents the front wheels and 16 the rear wheels of a motor vehicle. Placed adjacent to these wheels 15 and 16 are casings 17 carried from the axle of the vehicle by means of hangers 19. Pivoted in each of the casings 17 is a lever 20 carrying at its lower end a roller 21. This roller 21 coöperates with a wedge-shaped projection 22 on the upper face of a shoe 23 which is pivoted at 24 to the casing 17. The lower face of the shoe 23 is provided with teeth 25 which are adapted to make contact with the ground when the shoe 23 is forced through the opening 26 in the lower face of the casing 17 by the operating of the lever 20. The lever 20 is held in its normal position by means of a coil spring 27. The shoe 23 is retracted by means of a rod 29 pivoted at one end to the said shoe and at the other to the lever 20. In order to utilize the momentum of the vehicle itself in forcing the shoe 23 against the ground I secure to the lever 20 a clamping shoe 28, shown in detail in Figs. 5 and 6. This clamping shoe 28 is made wider at the bottom than at the top as best shown in Fig. 6, so that when it is forced against the tire of the wheel 16 the tire will be clamped in the shoe and consequently the shoe will be drawn upward and forward so as to transmit the power from the wheel 16 to the lever 20. The shoe 28 may be secured to the lever 20 by means of a solid rod 30, as shown in Fig. 2. I prefer, however, to secure the shoe to the lever by means of a pair of coil springs 31 as shown in Figs. 5 and 6 so as to lessen the shock caused by applying the brake.

In order to force the lower end of the shoe 28 toward the wheel 16 I prefer to form on said shoe a cam-shaped projection 32 as shown in Fig. 2 and to provide the casing 17 with a roller 33 which acts upon said cam-shaped projection and thus forces the lower end of the shoe toward the wheel as it is drawn upward. The shoe 28 is made of comparatively light metal and is provided with a lining 34 of leather or other suitable material to prevent injury to the tire of the wheel 16. In order to vary the curvature of the brake 28 so as to insure its effectively clamping the wheel 16 I provide the rear face of the said shoe with an adjusting rod 35 which is secured at its upper end to a projection 36 at the outer edge of the shoe. The lower end of the adjusting rod 35 passes through an opening in a lug 37 and is provided with a nut 38 by means of which the curvature of the shoe may be varied.

In order that the casing 17 adjacent to the rear wheels may be swung away from the wheels to allow the removal and replacing of the tires I provide the hangers 19 with knuckle joints 40. In order to hold the parts of the hanger 19 in their normal position a key or wedge 41 is provided as shown in Fig. 4. The hangers 19 carrying the casing 17 adjacent to the front wheels 15 might also be provided with knuckle joints but as the wheels may be swung away from the casing by the usual steering gear this is not essential.

Attached to the upper end of each of the levers 20 adjacent to the rear wheels is a cable 42. This cable 42 passes around a sheave 43 which serves to hold the cable out of contact with the axle of the rear wheel. This sheave 43 may be carried over the axle as shown in Fig. 1 or it may be carried from the hanger 19 as shown in Figs. 3 and 4. After passing around the sheave 43 the cable 42 is attached to an arm 44 projecting downwardly from a rock shaft 45 as best shown in Fig. 2. This rock shaft 45 is provided between the arms 44 with an arm 46 to which is attached a cable 47. This cable 47 passes over a sheave 48 carried by the casing of the propeller shaft. After passing over the sheave 48 the cable 47 passes under a sheave 50 carried on the lower end of a plate 51 carried in the casing 52. This plate 51 is similar to the shoe 23 hereinbefore described, except that it is not provided with teeth.

The upper face of the plate 51 is provided with an arm 59 to which is attached the end of the cable 47. The cable 47 passes forward from the sheave 50 and around a sheave 53 before passing to the arm 59. The plate 51 is operated by means of a pedal 54. This pedal 54 is preferably provided with a detent 55 coöperating with a toothed track 56. The arm 59 has attached to it in addition to the cable 47 a second cable 57 which passes under the sheave 53 and thence around a sheave 58 on the front axle. The end of the cable 57 is secured to the lever 20 of the casing 17 adjacent to the front wheel 15. In this way when the pedal 54 is operated the shoe 23 of the casing 17 adjacent to both the front and rear wheels will be forced downwardly by the action of the rollers 21.

In addition to the braking mechanism above described I prefer to provide the rear wheels 16 with drums 60 coöperating with brake shoes 61, as shown in detail in Fig. 7. Each of these brake shoes 61 is provided near its forward end with an inclined projection 62 and near its rear end with an inclined projection 63. These projections are engaged by rollers 64 and 65 respectively carried by a cross bar 66. In order to operate the shoes 61 each is provided at its forward end with an inclined projection 67 adapted to be engaged by a roller 68 carried on a lever 69. This lever 69 has attached to it a rod or cable 70 which extends to an arm 71 on a rock shaft 72. One of these arms 71 preferably that at the right hand side of the machine is prolonged into an operating lever 73 as best shown in Fig. 2. The upper end of this lever is preferably curved as shown at 74 and is provided with a detent 75 which may be engaged by the fore finger of the operator so as to release the lever. It will be evident that when the lever is operated so as to force the shoe 61 around the drum 60 the action of the wheels 64 and 65 upon the inclined surfaces 62 and 63 will firmly clamp the shoe against the drum. In addition to these brakes I prefer also to provide the propeller shaft with a drum 76 coöperating with a brake shoe 77 similar in construction to the brake shoes 61 hereinbefore described. In order to operate this brake shoe 77 a cable 78 extends therefrom around a sheave 79 to an auxiliary pedal 80.

Having fully described by invention, what I claim as new and desire to secure by Letters Patent of the United States, is:

1. In a vehicle brake, the combination with the vehicle body and wheels, of a hollow casing carried by said body, a shoe pivotally mounted in said casing and adapted to bear against the wheel supporting surface, a pivoted lever extending within said casing and having its end coöperating with said shoe, and means for operating said lever.

2. In a vehicle brake, the combination with a vehicle body and wheels, of a hollow casing carried by said body, a shoe pivotally mounted in said casing, a pivoted lever extending in said casing and provided with an anti-friction roll coöperating with said shoe to actuate the same, and means for operating said lever.

3. In a vehicle brake, the combination with the vehicle body and wheels, of a member carried by said body, a shoe pivotally mounted on said member so as to swing into and out of contact with the wheel supporting surface, a pivoted lever bearing on said shoe and adapted to move along the same toward and away from its pivot point, and a clamping shoe coöperating with said shoe and attached to said lever to actuate the same to apply said first-named shoe.

4. In a vehicle brake, the combination with the vehicle body and wheels, of a member carried by said body, a shoe pivotally mounted to said member and adapted to bear against the wheel supporting surface, a lever pivotally mounted to said member and provided with an anti-friction roll coöperating with said shoe to actuate the same, and a clamping shoe adapted to clamp the wheel and to operate said lever.

5. In a vehicle brake, the combination with the vehicle body and wheels, of a hollow casing carried by said body, a shoe pivotally mounted within said casing and adapted to bear against the wheel supporting surface, a lever pivoted in said casing and coöperating with said shoe, and a clamping shoe adapted to clamp the wheel and to operate said lever.

6. In a vehicle brake, the combination with the vehicle body and wheels, of a member carried by said body, a shoe pivotally mounted in said member and provided on its lower face with teeth, a lever pivoted to said member and provided with an anti-friction roll coöperating with said shoe to actuate the same, and a clamping shoe for clamping the wheel and operating said lever.

7. In a vehicle brake, the combination with a vehicle body and wheels, of a member carried by said body, of a shoe pivotally mounted on said member and adapted to bear against the wheel supporting surface, a lever for actuating said shoe, a clamping shoe, and yielding connections between said clamping shoe and lever for actuating the latter.

8. In a vehicle brake, the combination with the vehicle body and wheels, of a member carried by said body, a shoe pivotally mounted on said member, a lever pivoted to said member and operating said shoe, a clamping shoe for operating said lever, and adjusting means for varying the curvature of said clamping shoe.

9. In a vehicle brake, the combination with the vehicle body and wheels, of a hollow casing, a shoe pivotally mounted in said casing, a lever pivoted to said casing for operating said shoe, means for actuating said lever, a support for said casing, said support being provided with a joint for swinging the casing away from the wheel.

10. In a vehicle brake, the combination with the vehicle body and wheels, of a member carried by said body, a shoe pivotally mounted on said member, a lever pivoted to said member for operating said shoe, a clamping shoe for operating said lever, said clamping shoe being provided at its lower end with an inclined projection, an abutment carried by said member and coöperating with said projection to force the shoe toward the wheel.

11. In a vehicle brake, the combination with the vehicle body and wheels, of a member carried by said body, a shoe pivotally mounted on said member, a lever pivoted to said member for operating said shoe, a clamping shoe for clamping the wheel and operating said lever, said clamping shoe being provided at its lower end with an inclined projection, an anti-friction roll carried by said member and forming an abutment coöperating with said inclined projection to force the shoe toward the wheel.

12. In a vehicle brake, the combination with the vehicle body and wheels, of a hollow casing carried by said body, a shoe pivotally mounted within said casing, a pivoted lever extending within said casing and coöperating with said shoe, a clamping shoe for clamping the wheel and operating said lever, the lower end of said clamping shoe being provided with an inclined projection, and an anti-friction roll carried by said casing and forming an abutment coöperating with said projection to force the shoe toward the wheel.

13. In a vehicle brake, the combination with the vehicle body and wheels, of a hollow casing carried by said body, a shoe pivotally mounted within said casing and provided on its lower face with teeth, a pivoted lever extending into said casing and provided with an anti-friction roll coöperating with said shoe to actuate the same, and a clamping shoe for clamping the wheel and actuating said lever.

In testimony whereof, I have hereunto set my hand and affixed my seal in the presence of the two subscribing witnesses.

JOHN A. McGRATH. [L. S.]

Witnesses:
E. E. HUFFMAN,
ELIZABETH BAILEY.